United States Patent Office.

HENRY G. DAYTON, OF DAYTON, OHIO.

Letters Patent No. 97,469, dated November 30, 1869.

IMPROVED COMPOUND FOR DISINFECTING AND DEODORIZING.

The Schedule referred to in these Letters Patent and making part of the same.

*To all whom it may concern:*

Be it known that I, HENRY G. DAYTON, of Dayton, in the county of Montgomery, and State of Ohio, have invented and made a certain new and useful Deodorizing and Disinfecting-Compound; and I do hereby declare the following to be a full, clear, and exact description of the said invention, sufficient to enable others to fully understand and make use of the same.

I desire to premise that my invention consists essentially of a combination of substances, whose individual properties are too generally familiar to be particularly alluded to here, but whose association or combination constitutes a new and highly useful article, widely differing in its nature and beneficial effects from all things heretofore produced.

My compound consists of charcoal, lime, and a distillate of coal-tar, which may be used in about the proportion of nine parts of the first to one of the second, and sufficient of the third to saturate the mass.

I have found that the purifying, antiseptic, deodorizing, and disinfectant properties of the lime and charcoal are greatly enhanced by the other member of the composition, namely, the oil or distillate obtained from coal-tar, or any of the products thereof, which may be due to the presence of carbolic acid or naphtha, or kindred light oil or oils.

Furthermore, the admixture so modifies the commonly strong and unpleasant smell of the carbolic acid that the compound possesses and diffuses an agreeable odor.

The compound, when in use, preserves its efficacy for a long period of time.

I claim the within-described compound.

HENRY G. DAYTON.

Witnesses:
  EDWIN J. MCLAIN,
  J. R. NOTTINGHAM.